United States Patent Office 3,475,352
Patented Oct. 28, 1969

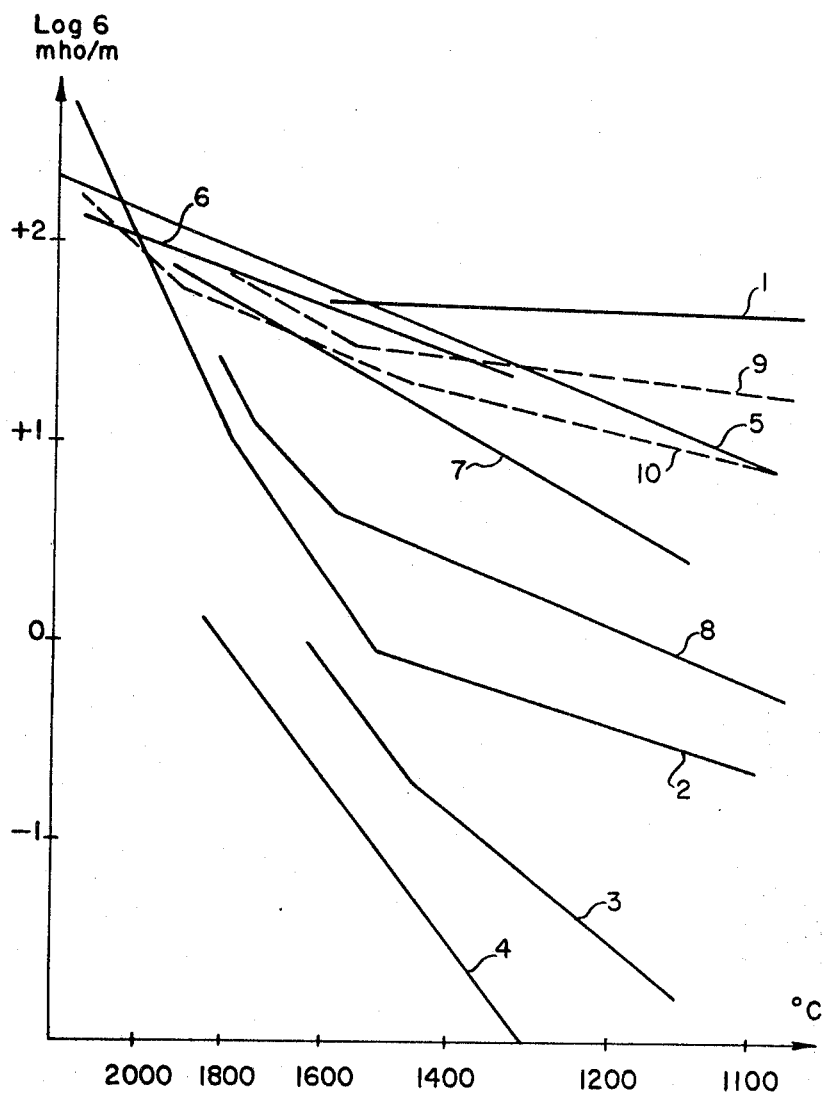

3,475,352
ELECTRICALLY CONDUCTIVE CERAMIC MATERIAL
Anne-Marie Anthony, nee Barbier, Meudon, Marc Foex, Montlouis, and David Yerouchalmi, Issy-les-Moulineaux, France, assignors to Commissariat a l'Energie Atomique, Paris, France
Filed Oct. 31, 1966, Ser. No. 590,534
Claims priority, application France, Nov. 3, 1965, 37,150
Int. Cl. H01b 1/08; C04b 35/48
U.S. Cl. 252—520   2 Claims

ABSTRACT OF THE DISCLOSURE

A conductive refractory ceramic material is composed of chromites of rare earths and/or yttrium and zirconia, the proportion of zirconia being 5 to 50% molar. Rare-earth oxides from 5 to 25% molar relative to the zironia may also be added.

---

This invention relates to refractory ceramic materials having a base of rare-earth chromites as well as to methods for the fabrication of said materials and applications thereof.

In certain fields of interest such as, in particular, in the fabrication of electrodes which are intended for magnetohydrodynamic energy converters, it is known to make use of ceramic materials composed of rare-earth chromites which correspond to the general formula $RCrO_3$, wherein R is any metal of the lanthanide or yttrium group. These highly refractory materials have the advantage of good conductivity of the electronic type, thereby permitting operation of electrodes in direct current at high temperatures. Such materials also retain good conductivity at lower temperatures and even down to ordinanry temperature.

The object of the present invention is to achieve an even greater improvement in the conductivity of these ceramic materials at very high temperature in order to facilitate the emission of electrons at the hot frontal face of the electrode while retaining good conductivity at the cold face. The invention is also intended to permit easier fabrication of these materials and to improve their stability during high-temperature operation.

Accordingly, the invention proposes a ceramic material composed of electrically conductive ceramic material, characterized in that said material is constituted by chromites of rare earths and/or of yttrium and by zirconia, the proportion of zirconia being greater than 5% molar (gram molecular weight) and preferably of the order of 30 to 50% molar (gram molecular weight). In accordance with an alternative form, the material in accordance with the invention also comprises the rare-earth oxides such as, for example, gadolinium.

The invention also proposes a method of fabrication of ceramic materials which is essentially characterized in that it comprises crushing of rare-earth chromites, of zirconia and possibly also of rare-earth oxides, shaping of the mixture of crushed products and sintering of said products.

In accordance with a preferred form of execution of the method under consideration, the products are crushed to a suitable particle size, the shaping operation is carried out under a mechanical pressure of at least 2 t./cm.² and the sintering operation is carried out at a temperature which is higher than 2000° C.

According to another form of execution, the method comprises the addition to the crushed products of a substantially stoichiometric mixture of chromic oxide and rare earth oxides.

Said mixture of oxides of chromium and rare earths can be obtained in particular by co-precipitation of hydroxides by addition of ammonia starting from a mixture in substantially stoichiometric proportions of aqueous solutions of soluble salts of chromium and rare earths, followed by calcining of the hydroxides. The soluble salts are usually constituted by chlorides and/or nitrates. The precipitates decompose between 300 and 400° C. to yield oxides and water. The mixture of chromic oxide and rare earth oxides which is added to the crushed rare-earth chromites serves as a binder and plays a contributory role together with the zirconia in facilitating the sintering process.

In the particular case of lanthanum a slight loss of the oxide of free lanthanum requires that the proportion of chromic oxide $Cr_2O_3$ in the co-precipitate should be slightly higher than the stoichiometric ratio. For one molecule of $La_2O_3$, it is preferable to have 1.02 to 1.05 molecule of $Cr_2O_3$.

The proportion by weight of said mixture of oxides which is prepared by calcination of co-precipitated hydroxides with respect to the chromites which are obtained by fusion or sintering and crushed is advantageously comprised between 5 and 25% molar (gram molecular weight). This proportion makes it possible to lower the sintering temperature to a temperature of the order of 1500° to 1650° C. according to the porosity to be obtained.

In the method according to the invention, the calcination of hydroxides prior to mixing with the crushed chromites is preferably carried out at a temperature comprised between 600 and 1200° C., thereby making it possible, by initiating the formation of chromite grains, to ensure better agglomeration during the subsequent sintering process.

It is also possible to facilitate the sintering of powders of crushed mixtures of rare-earth chromites obtained by fusion or sintering, of zirconia and possibly also of rare-earth oxides, by carrying out a very partial surface attack of these products with nitric acid.

ELECTRICAL CONDUCTIVITIES
(Mho/m.)

| | T.°, K. | | | | | |
|---|---|---|---|---|---|---|
| | 1,500 | 1,800 | 1,900 | 2,000 | 2,100 | Electrolysis |
| $ZrO_2$, 7% $Sm_2O_3$ | 16 | 47 | 62 | 79 | 100 | None. |
| $ZrO_2$, 25% $Gd_2O_3$ | 18 | 53 | 67 | 83 | 100 | Do. |
| $ZrO_2$, 8% $Y_2O_3$ | 10 | 31 | 43 | 58 | 77 | High. |
| $LaCrO_3$ | 40 | 45 | 48 | 50 | 53 | None, $\sigma=33$, 1,000° K. |
| $ZrO_2$, 21% $Nd_2O_3$ | 7 | 23 | 31 | 42 | 55 | None. |
| $ZrO_2$, 4% CaO | 4 | 16 | 21 | 28 | 36 | Partial. |
| $ZrO_2$, 15% $Gd_2O_3$ | 11 | 22 | 25 | 27 | 29 | None. |
| $ZrO_2$ | 0.5 | 1.2 | 2.2 | 6 | 25 | Do. |
| $ZrO_2$, 80% $SrZrO_3$ | 0.36 | 1.6 | 2.5 | 5 | 10 | Do. |
| $ZrO_2$, 33% $LaCrO_3$ | 20 | 30 | 35 | 50 | 70 | None, $\sigma=5$, 1,000° K. |
| $ZrO_2$, 16% $Gd_2O_3$; 33% $LaCrO_3$ | 14 | 30 | 40 | 52 | 71 | None, $\sigma=7.5$, 1,000° K. |

The table which is given above indicates the electrical conductivities at high temperature of different refractory materials having a zirconia base. The table also indicates the electrical conductivity of lanthanum chromite, which remains of the order of 40 to 50 mho/m. from 1500° K. up to 2100° K.

The above table clearly demonstrates the high electrical conductivities of the mixtures of zirconia and rare-earth oxides at temperatures of 2000/2100° K., whereas at temperatures of the order of 1500° K., these products have a much lower conductivity. A fact which has additionally been observed is that additions of lime, for example, result in electrolytic destruction of electrodes comprising stabilized zirconium oxide in cubic form, which makes it impossible to utilize this material in direct current.

Is is a noteworthy fact that the ceramic materials in accordance with the invention are able to withstand heating up to temperatures of 2000° K. without sustaining any impairment, despite the presence of a high proportion of zirconia which is employed in monoclinic form and which undergoes an allotropic transformation at approximately 1000° C. and changes to the quadratic form.

The ceramic materials in accordance with the invention also have the advantage of retaining a conductivity of the order of 40 to 50 mho/m. between ordinary temperature and approximately 1550° C. while at the same time exhibiting at higher temperatures increasing conductivity which attains approximately 100 mho/m. at approximately 1900 to 2000° K.

The figure annexed hereto shows the variations as a function of temperature of the electrical conductivity of the following materials:

Curve 1: Lanthanum chromite $LaCrO_3$
Curve 2: Zirconia $ZrO_2$
Curve 3: $CrZrO_3$
Curve 4: $CaZrO_3$
Curve 5: $ZrO_2 + 10\%$ mol $Y_2O_3$
Curve 6: $ZrO_2 + 25\%$ mol $Gd_2O_3$
Cprve 7: $ZrO_2 + 21\%$ mol $Nd_2O_3$
Curve 8: $ZrO_2 + 13\%$ mol $La_2O_3$
Curve 9: $ZrO_2 + 33\%$ mol $LaCrO_3$
Curve 10: $(ZrO_2 + 16\%$ mol $Gd_2O_3) + 33\%$ mol $LaCrO_3$ The rising of the curve of electrical conductivities above 1550° K. is noted in the accompanying figure in the case of the mixtures in accordance with the invention (curves 9 and 10).

The properties of the ceramic material in accordance with the invention make it of special interest in the fabrication of electrodes for magnetohydrodynamic energy generators. Now, it is a known fact that, in these generators, the electrodes must establish an electrical connection between very-high-temperature combustion gases containing alkaline seeding material and a low-temperature conductor. The electrodes must therefore be capable of withstanding very high temperatures (of the order of 2000° K.), must be chemically inert and have an electrical conductivity which is higher than that of the plasma produced by the combustion gases and the alkaline seeding material, the conductivity of the plasma being of the order of 10 mho/m.

The good electrical conductivity of the ceramic material in accordance with the invention accordingly constitutes an outstanding advantage in this application. In effect, inasmuch as this conductivity remains high even down to room temperature, it therefore remains sufficient at the cold face of the electrode to avoid the use of electric relays which were provided in conventional electrodes. Such relays had to be constructed of costly noble metals such as platinum, for example, inasmuch as their function was to conduct electricity from the hot face of the electrode in contact with the plasma up to the support unit which is cooled by a circulation of water and serves as a current supply connection.

A further advantage of the material in accordance with the invention, especially when compared with the rare-earth chromites alone, lies in the increase in conductivity (from 50 to 100 mho/m. approx.) between 1550° K. and 2000° K. This property makes it possible to establish excellent electrical contacts with the ionized gases on the hot frontal face of the electrode, thus resulting in a substantial reduction in the voltage drop at the level of these contacts.

However, the advantages of the material in accordance with the invention does not solely lie in its conductivity.

In addition, the material according to the invention makes it possible to attain operating temperatures of a higher order than materials of the prior art without giving rise to any danger of electrolytic phenomena; the conductivity of the material constituted by the chromites of rare earths, by zirconia (monoclinic or quadratic but not cubic, and possibly also by the rare-earth oxides such as, in particular $Sm_2O_3$, $Gd_2O_3$, $Nd_2O_3$) is of the electronic type and there does not take place any polarization phenomenon which might lead to the destruction of electrodes under normal operating conditions of a magnetohydrodynamic converter when generating direct current.

The non-dissociation of the material according to the invention makes it possible to operate the electrodes at hot-face temperatures which are higher than 2000° K., whereas this temperature must be limited to approximately 1800° K. when the rare-earth chromites are employed alone.

Finally, the presence of zirconia facilitates sintering of the rare-earth chromites. Accordingly, sintering can be carried out at a lower temperature even for the same porosity of the end product.

A further application of the ceramic material according to the invention which is of particular interest is the fabrication of electric heating elements which are capable of operating at very high temperatures, even in an oxidizing atmosphere. These temperatures, which were limited to 1700° C. in the case of platinum or platinum-rhodium resistors can attain 2200° C. or even higher values. Furthermore, it is not necessary to heat the conductive element prior to application of voltage as is the case, for example, when use is made of elements having a base of zirconia which is stabilized with calcium oxide or magnesia, such elements being non-conductive at ordinary temperature.

Two methods of fabrication of particular electric heating elements according to the invention will now be indicated, although it will be understood that these methods are given solely by way of indication and not in any sense by way of limitation.

In a first example, a tube of ceramic material made up of lanthanum chromite mixed with 30 to 50% monoclinic zirconia to which may be added rare-earth oxides is employed as susceptor inside a copper spiral which is cooled by a circulation of water and subjected to the influence of a high-frequency electric generator. A suitable heat insulation is provided in the annular space between the copper spiral and the ceramic tube. There is thus constituted a high-frequency induction furnace which operates at high-temperature in an atmosphere of air. The temperature of the ceramic tube can attain values above 2200° C.

In the second example considered, the ceramic material is employed in the form of Joule-effect heating elements within closed chambers, or simply as a radiant element in the presence of air. For example, a full cylindrical rod having a larger diameter at each end is formed of the ceramic material and the metallic current supply connections are fixed on the lower-temperature zones at each end. The current supply connections may if necessary be cooled by means of an internal circulation of water or by any other suitable means.

What we claim is:

1. Electrically conductive ceramic material consisting essentially of a material selected from the group consisting of rare earth chromite compounds and yttrium chromite and mixtures thereof and zirconia, the proportion of zirconia being from 5 to 50% molar and preferably on the order of 30 to 50% molar.

2. Ceramic material as defined in claim 1 wherein said material additionally comprises rare earth oxides in a proportion of 5 to 25% molar relative to the zirconia.

References Cited

UNITED STATES PATENTS 2,681,944   6/1954   Comstock _____ 252—520
3,149,253   9/1954   Luebke _____ 310—11

LEON D. ROSDOL, Primary Examiner

J. D. WELSH, Assistant Examiner

U.S. Cl. X.R.

106—57, 66; 252—521; 310—11